(12) United States Patent
Kasetani et al.

(10) Patent No.: US 11,617,233 B2
(45) Date of Patent: Mar. 28, 2023

(54) THERMAL INSULATION STRUCTURE FOR VEHICLE WINDOW DEVICE

(71) Applicants: NIFCO INC., Kanagawa (JP); TOYOTA JIDOSHA KABUSHIKI KAISHA, Aichi-ken (JP); KURABE INDUSTRIAL CO., LTD., Shizuoka (JP)

(72) Inventors: Yasuki Kasetani, Kanagawa (JP); Ryuichi Shinkai, Aichi-ken (JP); Toshikazu Nagai, Shizuoka (JP); Tatsunori Suzuki, Shizuoka (JP)

(73) Assignees: NIFCO INC., Kanagawa (JP); TOYOTA JIDOSHA KABUSHIKI KAISHA, Aichi-ken (JP); KURABE INDUSTRIAL CO., LTD., Shizuoka (JP)

( * ) Notice: Subject to any disclaimer, the term of this patent is extended or adjusted under 35 U.S.C. 154(b) by 565 days.

(21) Appl. No.: 16/229,834

(22) Filed: Dec. 21, 2018

(65) Prior Publication Data

US 2019/0208583 A1 Jul. 4, 2019

(30) Foreign Application Priority Data

Dec. 28, 2017 (JP) .............................. JP2017-254738

(51) Int. Cl.
*H05B 3/84* (2006.01)
*B60S 1/02* (2006.01)
(Continued)

(52) U.S. Cl.
CPC ................ *H05B 3/84* (2013.01); *B60R 11/04* (2013.01); *B60S 1/026* (2013.01); *B60J 1/20* (2013.01); *B60R 2011/0026* (2013.01)

(58) Field of Classification Search
CPC .... H05B 3/84; H05B 3/267; H05B 2203/003; H05B 2203/016; B60S 1/026; B60S 1/023; B60R 11/04; B60R 2011/0026; B60J 1/20
See application file for complete search history.

(56) References Cited

U.S. PATENT DOCUMENTS

| 10,397,982 B2 * | 8/2019 | Usami | B60S 1/0848 |
| 2003/0155467 A1 * | 8/2003 | Petrenko | H05B 3/84 |
| | | | 244/134 R |

(Continued)

FOREIGN PATENT DOCUMENTS

| JP | 2002305157 A | 10/2002 |
| JP | 2003100426 A | 4/2003 |

(Continued)

OTHER PUBLICATIONS

Japanese Office Action for Japanese Application 2017-254738, dated Oct. 15, 2019 (Translation Included).

*Primary Examiner* — Shawntina T Fuqua
(74) *Attorney, Agent, or Firm* — Thomas|Horstemeyer, LLP (57) ABSTRACT

A thermal insulation structure for a vehicle window device is provided with a heater is disposed on a vehicle interior side, a heat-receiving component that is provided between the window and the heater, and that, by receiving heat from the heater, imparts radiant heat to the window, and a thermal insulation layer that is provided at a surface of the heater on an opposite side from the heat-receiving component, wherein the thermal insulation layer is formed by mutually superimposing a plurality of thermal insulation materials, and of the plurality of thermal insulation materials, a thermal insulation material on a closest side to the heater has greater heat resistance than a thermal insulation material on a furthest side from the heater, and the thermal insulation (Continued)

material on the furthest side from the heater has a lower thermal conductivity than the thermal insulation material on the closest side to the heater.

6 Claims, 4 Drawing Sheets

(51) Int. Cl.
*B60R 11/04* (2006.01)
*B60J 1/20* (2006.01)
*B60R 11/00* (2006.01)

(56) References Cited

U.S. PATENT DOCUMENTS

| | | | |
|---|---|---|---|
| 2009/0101632 A1* | 4/2009 | Naylor | H05B 3/36 |
| | | | 219/202 |
| 2015/0034621 A1* | 2/2015 | Timmermann | B60R 11/04 |
| | | | 219/203 |
| 2016/0278166 A1* | 9/2016 | Seong | H05B 3/26 |
| 2021/0307123 A1* | 9/2021 | Gima | H05B 3/86 |

FOREIGN PATENT DOCUMENTS

| | | | |
|---|---|---|---|
| JP | 2007292199 A | 11/2007 |
| JP | 2010021031 A | 1/2010 |
| JP | 2016121804 A | 7/2016 |
| JP | 2017185896 A | 10/2017 |

\* cited by examiner

THERMAL INSULATION STRUCTURE FOR VEHICLE WINDOW DEVICE

CROSS-REFERENCE TO RELATED APPLICATION

This application is based on and claims priority under 35 USC 119 from Japanese Patent Application No. 2017-254738 filed on Dec. 28, 2017, the disclosure of which is incorporated by reference herein.

BACKGROUND

Technical Field

The present disclosure relates to a thermal insulation structure for a vehicle window device.

Related Art

A photographic device is sometimes provided at a vehicle interior side of a windshield of a vehicle. This photographic device is used, for example, as part of a pre-crash safety system.

If, for example, the temperature outside a vehicle is low, thereby leading to a heater being used inside the vehicle, this can cause condensation to form on an interior surface of the windshield. Additionally, when the external temperature is low, there is a possibility of ice and frost forming on the exterior surface of the windshield. In this state, because the photographic device is unable to function properly, a portion of the windshield through which light beams used by the photographic device are transmitted is warmed by heat from the heater so as to cause any condensation, frost, or ice or the like to disappear.

In a photographic device for a vehicle disclosed in Japanese Patent Application Laid-Open (JP-A) No. 2017-185896, a heat-receiving component is disposed between the windshield and the heater. Heat from the heater is received by this heat-receiving component and, as radiant heat, then warms the portions of the windshield through which light beams are transmitted. In addition, a single sheet of thermal insulation material is adhered to a rear surface of the heater. Any heat loss from the rear surface of the heater is inhibited by the thermal insulation effect of this thermal insulation material, and the warming effect of the heater via this heat-receiving component in portions through which light beams are transmitted is improved.

In the thermal insulation technology for a heater disclosed in JP-A No. 2017-185896, because the heater is thermally insulated by a single sheet of thermal insulation material, in order to improve the thermal insulation performance, it is necessary to increase the thickness of this thermal insulation material. However, considering the space inside the photographic device, increasing the thickness of the thermal insulation material would prove problematic. If, on the other hand, the thermal insulation material were formed using a material having a greater thermal insulation performance, then although it might be possible to ensure the thermal insulation performance while simultaneously inhibiting any thickness increase, there is a possibility that an adequate heat-resistance performance against heat directly transmitted from the heater might not be attainable.

SUMMARY

The present disclosure was conceived in view of the above-described circumstances, and in a structure in which a thermal insulation layer is provided at a rear surface of a heater that warms a window, it is an object thereof to provide a thermal insulation structure for a vehicle window device that is capable of ensuring heat-resistance properties and thermal insulation properties while simultaneously inhibiting any increase in the thickness of the thermal insulation layer.

A thermal insulation structure for a vehicle window device of a first aspect of the present disclosure is provided with a heater that is provided at a device main body that is disposed on a vehicle interior side of a vehicle window, a heat-receiving component that is provided between the window and the heater, and that, by receiving heat from the heater, imparts radiant heat to the window, and a thermal insulation layer that is provided at a surface of the heater on an opposite side from the heat-receiving component, wherein the thermal insulation layer is formed by mutually superimposing a plurality of thermal insulation materials, and of the plurality of thermal insulation materials, a thermal insulation material on a closest side to the heater has greater heat resistance than a thermal insulation material on a furthest side from the heater, and the thermal insulation material on the furthest side from the heater has a lower thermal conductivity than the thermal insulation material on the closest side to the heater.

In the thermal insulation structure for a vehicle window device of the first aspect, radiant heat from a heat-receiving component that receives heat from a heater is discharged so as to warm a window. As a result, even if condensation, frost, or ice form on a window, these can be made to disappear.

Moreover, in the above-described thermal insulation structure, a thermal insulation layer that is formed by mutually superimposing a plurality of thermal insulation materials is provided at the surface of the heater that is on the opposite side thereof from the heat-receiving component, and the heat resistance of the thermal insulation material on the side closest to the heater is made greater than the heat resistance of the thermal insulation material on the side furthest from the heater. Additionally, the thermal conductivity of the thermal insulation material on the side furthest from the heater is made lower than the thermal conductivity of the thermal insulation material on the side closest to the heater, in other words, the thermal insulation performance thereof is made greater. Because of this, it is difficult for failures caused by heat from the heater to be generated in the thermal insulation material of the thermal insulation layer on the side closest to the heater, while an adequate thermal insulation performance can be attained in the thermal insulation material on the side furthest from the heater. Accordingly, according to the above-described thermal insulation structure, compared with a structure in which the thermal insulation layer is formed by a single thermal insulation material, it is possible to ensure heat-resistance properties and thermal insulation properties while simultaneously inhibiting any increase in the thickness of the thermal insulation layer.

A thermal insulation structure for a vehicle window device of a second aspect of the present disclosure is characterized in that, in the thermal insulation structure for a vehicle window device of the first aspect, the thermal insulation layer is formed by mutually superimposing two sheets of the thermal insulation materials.

In the thermal insulation structure for a vehicle window device of the second aspect, because the thermal insulation layer is formed by mutually superimposing two sheets of thermal insulation materials, it is possible to inhibit any increase in the thickness of the thermal insulation layer.

A thermal insulation structure for a vehicle window device of a third aspect of the present disclosure is characterized in that, in the thermal insulation structure for a vehicle window device of the first or second aspects, the thermal insulation material on the furthest side from the heater is formed from a polyolefin foam material, while the thermal insulation material on the closest side to the heater is formed from a polyurethane foam material.

In the thermal insulation structure for a vehicle window device of the third aspect, because the thermal insulation material on the furthest side from the heater is formed from a polyolefin foam material which has a greater thermal insulation performance, while the thermal insulation material on the closest side to the heater is formed from a polyurethane foam material which has greater heat resistance, it is possible to effectively ensure heat-resistance properties and thermal insulation properties while simultaneously inhibiting any increase in the thickness of the thermal insulation layer.

According to the present disclosure, in a structure in which a thermal insulation layer is provided at a rear surface of a heater that warms a window, it is possible to provide a thermal insulation structure for a vehicle window device that is capable of ensuring heat-resistance properties and thermal insulation properties while simultaneously inhibiting any increase in the thickness of the thermal insulation layer.

BRIEF DESCRIPTION OF THE DRAWINGS

Exemplary embodiments of the present disclosure will be described in detail based on the following figures, wherein.

DETAILED DESCRIPTION

Next, a thermal insulation structure for a vehicle window device according to an exemplary embodiment of the present disclosure will be described using FIG. 1 through FIG. 4.

As is shown in FIG. 1 through FIG. 4, a thermal insulation structure S for a vehicle window device (hereinafter, this is referred to, where appropriate, as a 'thermal insulation structure S') of the present exemplary embodiment is a thermal insulation structure for a heater 42 that is provided at a window device for a vehicle 20 (hereinafter, this is referred to, where appropriate, as a 'window device 20') that is used in a vehicle.

Note that an arrow U, an arrow F, and an arrow W that are shown in the drawings respectively indicate a vehicle upward direction, a vehicle forward direction, and a vehicle width direction.

Figure 1:
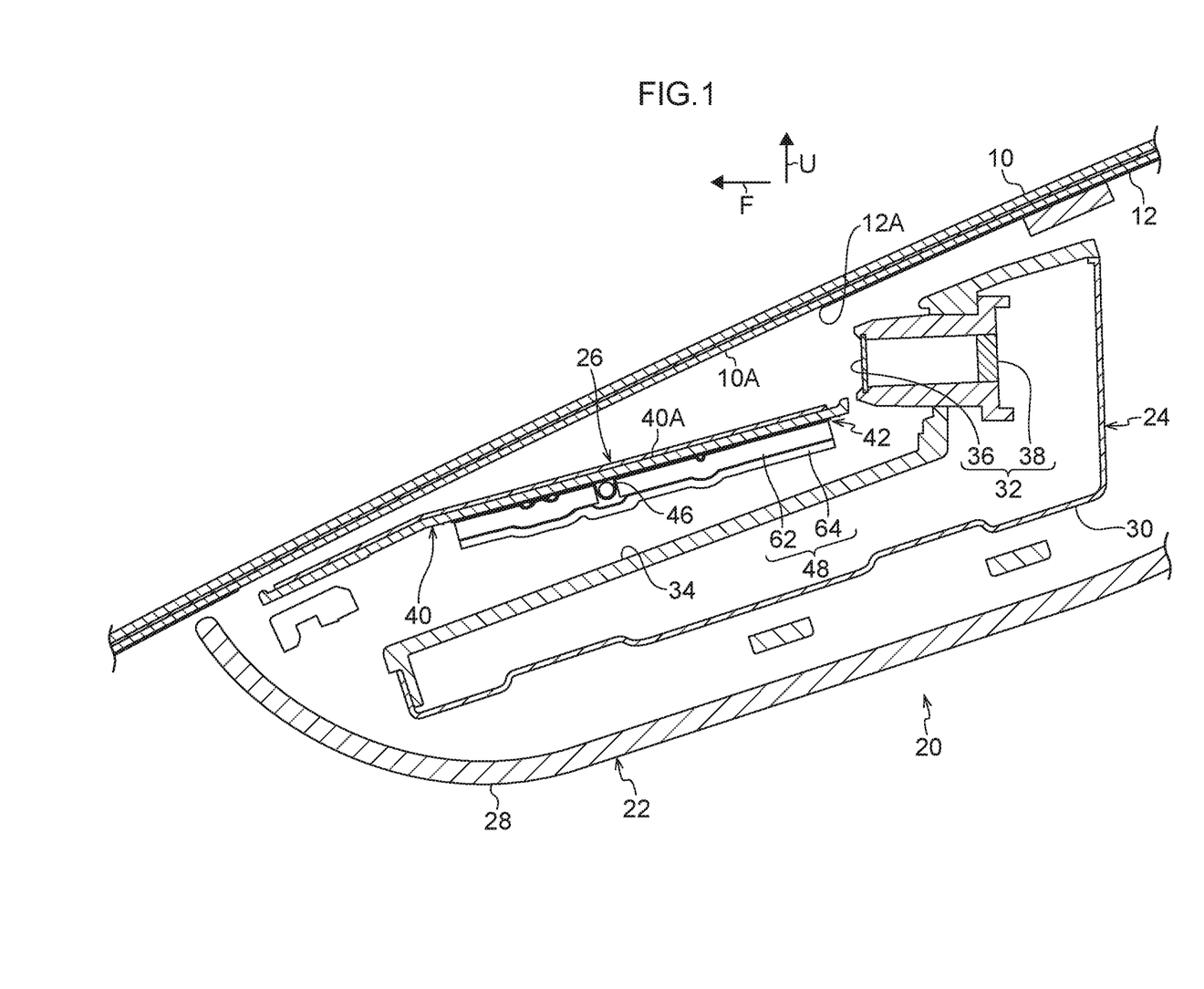
FIG. 1 is a side view of a vehicle window device according to an exemplary embodiment.

As is shown in FIG. 1, the window device 20 has a photographing function, and is used as part of a vehicle pre-crash safety system.

The window device 20 is provided with a device main body 22 that is disposed on a vehicle interior side of a windshield 10 of the vehicle and on a vehicle upper side thereof. Note that the windshield 10 is formed from a translucent material (for example, glass or resin or the like). Additionally, a light-shielding sheet 12 is adhered to an interior surface (i.e., the surface on the vehicle interior side) 10A of the windshield 10. A light transmission hole 12A is formed in a portion of the light-shielding sheet 12 through which reflected light beams (described below) are transmitted. Note that the present disclosure is not limited to the above-described structure, and a structure may also be employed in which the light-shielding sheet 12 is not adhered to the interior surface 10A of the windshield 10.

As is shown in FIG. 1, the device main body 22 is provided with a camera unit 24, a light-shielding heating unit 26, and a cover 28.

The camera unit 24 is provided with a housing 30 and an image acquisition unit 32. The housing 30 is formed from a resin material, and the image acquisition unit 32 is attached to an upper portion thereof. In addition, a recessed portion 34 that is used to fit a light-shielding hood having a substantially trapezoidal shape when looked at in plan view is provided at an upper surface of the housing 30 on the vehicle front side of the image acquisition unit 32.

The image acquisition unit 32 is provided with a lens 36, and an image sensor 38 that is positioned directly behind the lens 36. The image sensor 38 receives reflected light beams (i.e., photography light beams) that are formed by natural light that has been reflected towards the rear by an obstacle located in front of the camera unit 24, and has been transmitted through the lens 36. The size (i.e., the cross-sectional configuration) of the reflected light beams that strike the image acquisition unit 32 is restricted by the angle of view of the lens 36 of the image acquisition unit 32. Note that the size of the reflected light beams is set such that the reflected light beams do not interfere with the surface of a heat-receiving unit 40A of the light-shielding heating unit 26 (described below).

Figure 2:
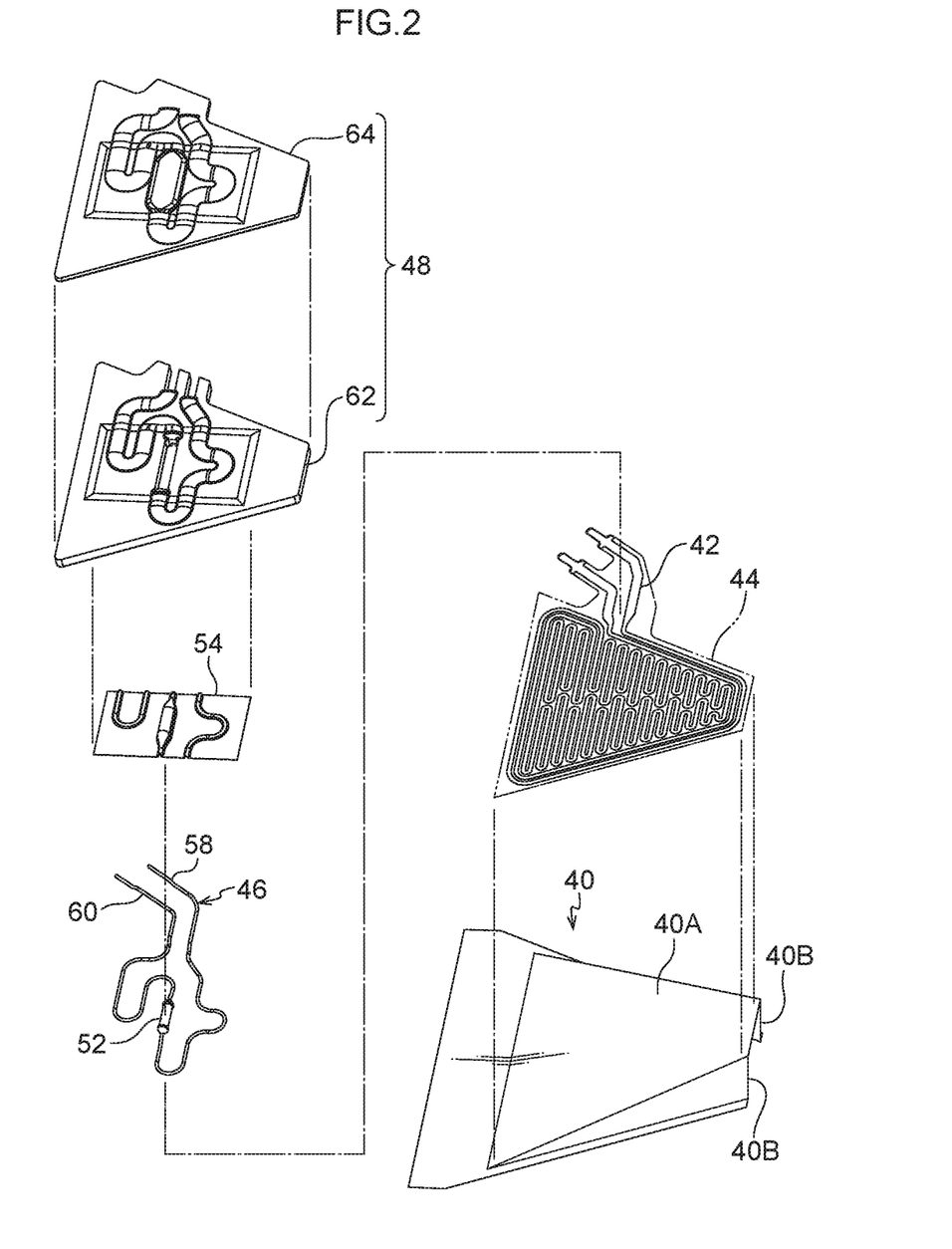
FIG. 2 is an exploded perspective view of a light-shielding heating unit.
Figure 3:
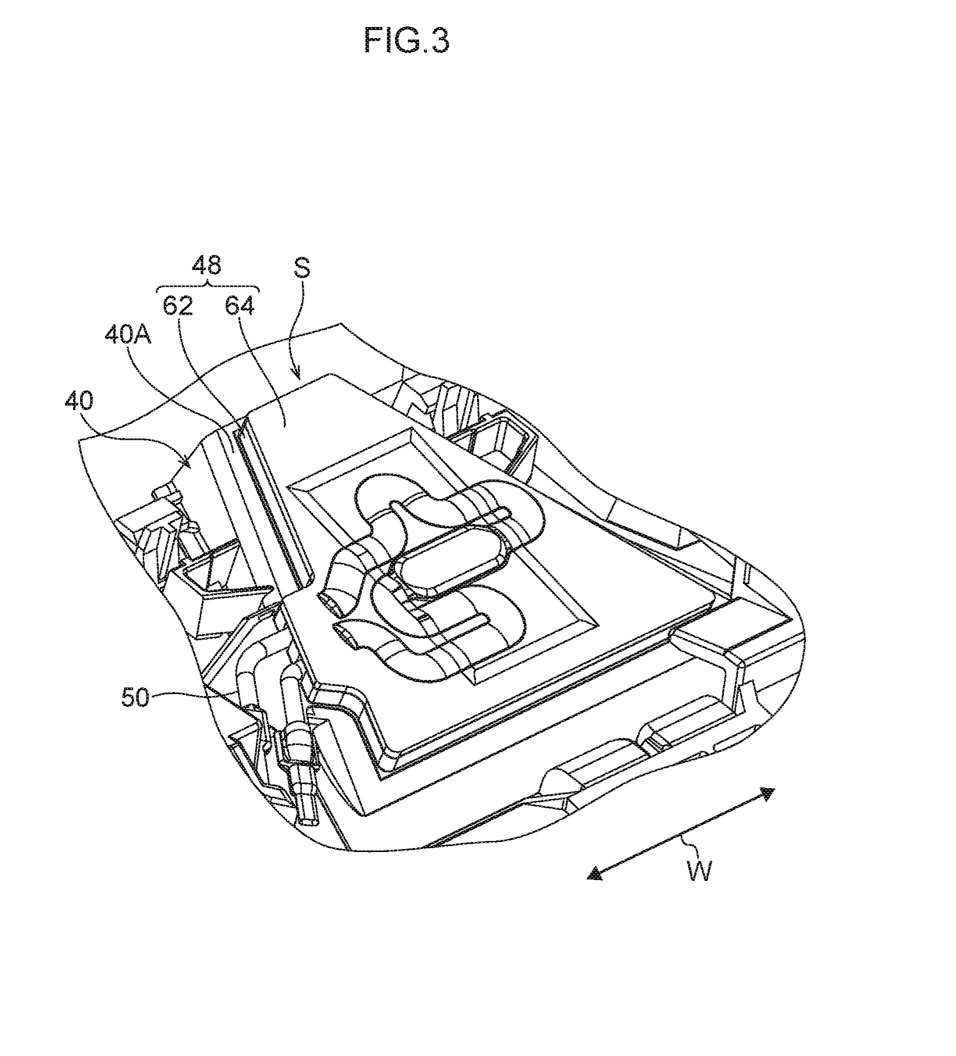
FIG. 3 is a lower surface view showing, from underneath, a light-shielding heating unit of an exemplary embodiment.

As is shown in FIG. 1 and FIG. 2, the light-shielding heating unit 26 is provided with a light-shielding hood 40, the heater 42, double-sided tape 44, a fuse module 46, a thermal insulation layer 48, and a cable module 50.

As is shown in FIG. 2, the light-shielding hood 40 is integrally molded from a hard resin material. This light-shielding hood 40 is provided with a heat-receiving portion 40A which is an isosceles trapezoid-shaped planar body when looked at in a front view, and a pair of side wall portions 40B that extend upwards from both left and right side edge portions of the heat-receiving portion 40A. The light-shielding hood 40 is disposed so as to face towards the windshield 10. Note that the light-shielding hood 40 of the present exemplary embodiment is an example of a heat-receiving component of the present disclosure.

Additionally, in the present exemplary embodiment, a non-woven cloth (for example, felt) is disposed on a surface of the light-shielding hood 40.

The heater 42 is a planar heater whose shape corresponds to the heat-receiving portion 40A. This heater 42 is formed from a metal having superior conductivity (for example, brass or stainless steel). Additionally, an insulation sheet (not shown in the drawings) whose shape corresponds to the heater 42 is adhered to a rear surface (i.e., a surface on the opposite side from the heat-receiving portion 40A) of the heater 42. Polyamide, for example, may be used as the material forming this insulation sheet.

The double-sided tape 44 is adhered to an upper surface of the heater 42 so as to cover the heater 42. The heater 42 and the heat-receiving portion 40A are adhered together via this double-sided tape 44. The double-sided tape 44 is formed from a resin material that has insulating properties (for example, tape formed by applying a silicon-based adhesive agent to both sides of tape-form polyimide).

The fuse module 46 is provided with double-sided tape 54, a fuse 52, and two lead wires 58 and 60. The double-sided tape 54 is formed from a resin material that has insulating properties (for example, from the same material as that used for the double-sided tape 44). The fuse 52 has a circular cylinder-shaped insulating case, and low-melting-point metal that is conductive and is fixed to the inside of the insulating case. The insulating case of the fuse 52 is adhered to a substantially central portion on an upper surface of the double-sided tape 54. The two leads 58 and 60 are adhered to the upper surface of the double-sided tape 54. One end of each of the two leads 58 and 60 is positioned inside the insulating case of the fuse 52, and is connected to one of the two ends respectively of the low-melting-point metal. Another end of each of the two leads 58 and 60 extends to an outer peripheral side of the double-sided tape 54.

Figure 4:
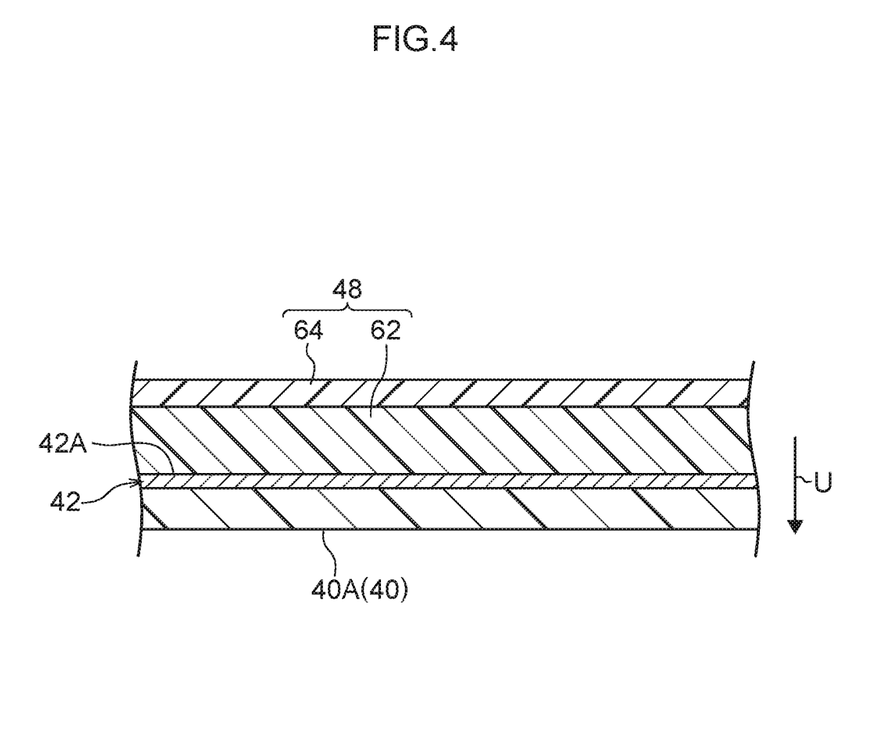
FIG. 4 is a cross-sectional view of a thermal insulation layer showing a thermal insulation structure of a vehicle window device.

As is shown in FIG. 4, the thermal insulation layer 48 is provided at a lower surface of the heater 42. More specifically, the thermal insulation layer 48 is in contact with the heater 42 via an insulating sheet (not shown in the drawings). An outer configuration of this thermal insulation layer 48 is the same shape as the heat-receiving portion 40A. Because of this, the entire rear surface of the heater 42 is covered by the thermal insulation layer 48.

Moreover, the thermal insulation layer 48 is formed by mutually superimposing a plurality (i.e., two in the present exemplary embodiment) of thermal insulation materials 62 and 64 that are formed from a resin material.

The thermal insulation material 62 which is disposed on the closest side to the heater 42 has greater heat resistance than the thermal insulation material 64 which is disposed on the furthest side from the heater 42.

In contrast, the thermal insulation material 64 which is disposed on the furthest side from the heater 42 has lesser thermal conductivity (in other words, has greater thermal insulation properties) than the thermal insulation material 62 which is disposed on the closest side to the heater 42.

It is preferable that, for example, a polyurethane foam material be used for the thermal insulation material 62. In contrast, it is preferable that, for example, a polyolefin foam material be used for the thermal insulation material 64.

Moreover, in the present exemplary embodiment, a thickness T1 of the thermal insulation material 62 is formed thicker than a thickness T2 of the thermal insulation material 64.

Note that the overall thermal insulation layer 48 that is formed by mutually superimposing the thermal insulation material 62 and the thermal insulation material 64 has insulating properties.

The cable module 50 is connected to the heater 42, and is formed so as to supply power to the heater 42.

Note that the thermal insulation structure S of the present exemplary embodiment is formed by the above-described heater 42, light-shielding hood 40, and thermal insulation layer 48.

Next, an operation of the window device 20 of the present exemplary embodiment will be described.

The image sensor 38 of the image acquisition unit 32 acquires images from reflected light beams that have been reflected towards the rear by an obstacle (for example, another vehicle) located in front of the vehicle in which the window device 20 is mounted, and then transmitted through the windshield 10, the light transmission hole 12A in the light-shielding sheet 12, and the lens 36. Additionally, the image acquisition unit 32 is able to transmit all of its image acquisition data to a control device (not shown in the drawings) each time a fixed time interval passes. If the control device determines, while the vehicle is traveling forward, that 'the object depicted in the image acquisition data is not an obstacle', or that 'the distance from the image sensor 38 to the obstacle is further than the distance given in the approach determination data', then the vehicle is able to continue traveling in a forwards direction without altering its course. Note that the determination performed by the control device of various types of objects in the image acquisition data can be executed using, for example, a known pattern matching method.

In contrast, if the control device determines, while the vehicle is raveling forward, that 'the current vehicle speed is within a predetermined range', and additionally that 'the object depicted in the image acquisition data is an obstacle', and also 'the distance from the image sensor 38 to the obstacle is closer than the distance given in the approach determination data', then the control device transmits a signal to the brake actuator of the vehicle. As a consequence of this, the brake actuator is operated with the result that, even if the driver does not depress the brake pedal, the respective braking devices apply braking force to the vehicle wheels. As a result, the speed of the vehicle is reduced and, if necessary, the vehicle may be brought to a halt.

When the external temperature outside the vehicle is low so that the heater inside the vehicle is turned on, there is a possibility of condensation forming on the windshield 10. Additionally, when the external temperature is low, there is also a possibility of ice or frost forming on the windshield 10. In this case, there is a concern that the image sensor 38 may acquire indistinct images of an object, or may be unable to acquire images of an obstacle.

Here, in the present exemplary embodiment, because the window device 20 is provided with the heater 42 and the heat-receiving portion 40A, if the external temperature falls below a predetermined temperature, power is supplied to the heater 42 by the control device, and the heater 42 emits heat.

The heat-receiving portion 40A receives the heat emitted from the heater 42, and radiant heat is then discharged from the heat-receiving portion 40A towards the windshield 10 so that the windshield 10 is warmed. As a consequence, any condensation, frost, or ice or the like that has formed on the windshield 10 is made to disappear.

Next, actions and effects of the thermal insulation structure S of the present exemplary embodiment will be described.

The thermal insulation structure S is provided with the thermal insulation layer 48 that is formed by mutually superimposing the thermal insulation materials 62 and 64 on the rear surface 42A of the heater 42, and the heat resistance of the thermal insulation material 62 on the side closest to the heater 42 is made greater than the heat resistance of the thermal insulation material 64 on the side furthest from the heater 42. Additionally, the thermal conductivity of the thermal insulation material 64 on the side furthest from the heater 42 is made lower than the thermal conductivity of the thermal insulation material 62 on the side closest to the heater 42, in other words, the thermal insulation performance thereof is improved. Because of this, it is difficult for failures caused by heat from the heater 42 to be generated in the thermal insulation material 62, while an adequate thermal insulation performance can be attained in the thermal insulation material 64. Accordingly, according to the thermal insulation structure S, compared with a structure in which the thermal insulation layer 48 is formed by a single thermal insulation material, it is possible to ensure heat-resistance properties and thermal insulation properties while simultaneously inhibiting any increase in the thickness of the thermal insulation layer 48. Because it is possible in this way to inhibit any increase in the thickness of the thermal insulation layer 48, the thermal insulation layer 48 can be mounted inside the window device 20 which, due to it being disposed inside the vehicle cabin, has limited mounting space.

Moreover, because heat from the rear surface side of the heater 42 is inhibited from escaping by the thermal insulation layer 48, the quantity of heat that is conveyed from the heater 42 to the heat-receiving portion 40A increases. As a result, because the windshield 10 can be heated rapidly and with little heat loss without the output from the heater 42 having to be raised excessively, any increase in the quantity of heat input into the image sensor 38 can be suppressed.

Moreover, in the thermal insulation structure S, because the thermal insulation layer 48 is formed by mutually superimposing the two sheets of thermal insulation material 62 and 64, any increase in the thickness of the thermal insulation layer 48 can be suppressed.

Furthermore, in the thermal insulation structure S, because the thermal insulation material 64 on the furthest side from the heater 42 is formed from a polyolefin foam material which has a superior thermal insulation performance, while the thermal insulation material 62 on the closest side to the heater 42 is formed from a polyurethane foam material which has greater heat resistance, it is possible to effectively ensure heat-resistance properties and thermal insulation properties while simultaneously inhibiting any increase in the thickness of the thermal insulation layer 48.

ture. For example, it is also possible for the window device to be disposed on the vehicle interior side of a rear window, and on the vehicle interior side of a side window.

Next, preferred combinations of thermal insulation materials used in the thermal insulation layer of the present exemplary embodiment were tested.

In this test, the respective types of thermal insulation layers shown in Table 1 were adhered to the same heater, and the surface temperatures of the heaters and the surface temperatures of the thermal insulation materials were measured respectively. Note that the pass criteria used in the evaluation were set as being a surface temperature of not more than 75° C. on the image sensor side of the thermal insulation material when the surface temperature of the heater reached 120° C.

Test conditions: 10° C. peripheral environment
Electricity energization to heater: constant energization at 13.6V
Temperature measurement point: between heater and light-shielding hood
Temperature fuse specifications: axial 44K φ1.65±0.1 143±3° C., no insulation tube, lead wires having an original length of 69 mm were arranged on the heater, and the directions of the heat-sensitive portions thereof (i.e., the two wires) were made mutually parallel.
LZ2000: Polyolefin foam sheet: Inoac Corporation Ltd
GS072: Polyolefin foam sheet: Inoac Corporation Ltd
TR32: Polyurethane foam sheet: Rogers Inoac Corporation Ltd
Hamagasu foam: Laminated aluminum foil and silicon foam body: Hamamatsu Gasket Corporation Ltd
838R: Aluminum glass cloth adhesive tape: Teraoka Seisakusho Co., Ltd

TABLE 1

| | | Comparative example 1 | Comparative example 2 | Comparative example 3 | Example 1 | Example 2 | Example 3 |
|---|---|---|---|---|---|---|---|
| Number of Thermal insulation materials | | 2 | 2 | 2 | 2 | 2 | 2 |
| Thickness of thermal insulation layer | | t3.0 | t3.0 | t2.0 | t2.9 | t2.23 | t2.6 |
| Thermal insulation material closest to heater | | Hamagasu foam t1.5 | TR32 t1.5 | TR32 t1.0 | TR32 t2.0 | TR32 t2.0 | TR32 t1.0 |
| Thermal insulation material furthest from heater | | TR32 t1.5 | TR32 t1.5 | TR32 t1.0 | LZ2000 t0.9 | 838R t0.23 | GS072 t1.6 |
| Heater surface temp. reaches 120° C. | Thermal insulation material surface temp. | 75.5° C. | 80.8° C. | 92.4° C. | 66.8° C. | 69.1° C. | 72.9° C. |
| | Time to reach temp | 3 min 15 sec | 3 min 9 sec | 2 min 53 sec | 2 min 49 sec | 3 min 10 sec | 2 min 44 sec |
| Thermal insulation material surface temp. reaches 75° C. | Heater surface temp | 118.75° C. | 114.10° C. | 97.10° C. | 134.10° C. | 129.35° C. | 125.00° C. |
| | Time to reach temp | 3 min 10 sec | 2 min 48 sec | 1 min 50 sec | 3 min 43 sec | 3 min 54 sec | 3 min 1 sec |
| Evaluation | | Fail | Fail | Fail | Pass | Pass | Pass |

In the above-described exemplary embodiment, the thermal insulation layer 48 is formed by two sheets of thermal insulation material, however, the present disclosure is not limited to this structure, and it is also possible for the thermal insulation layer 48 to be formed by three or more sheets of thermal insulation material.

Moreover, in the above-described exemplary embodiment, a structure is employed in which the window device 20 is disposed on the vehicle interior side of the windshield, however, the present disclosure is not limited to this struc- As can be understood from Table 1, it can be seen from the surface temperature of the thermal insulation material when the surface temperature of the heater reached 120° C. that the thermal insulation performances of Examples 1 to 3 were vastly improved compared with Comparative examples 2 and 3 in which the thermal insulation layer was formed by mutually superimposing two sheets of the same thermal insulation material. Furthermore, it can also be seen that that the thermal insulation performances of Examples 1 to 3 were vastly improved compared with Comparative example 1 in which the thermal insulation layer was formed by mutually superimposing two sheets of different thermal insulation materials. It can also be seen that the thermal insulation performance of Example 1, in particular, was markedly improved.

Exemplary embodiments of the present disclosure have been described above based on examples, however, these exemplary embodiments are simply an example of the present disclosure and various modifications and the like may be made thereto insofar as they do not depart from the spirit or scope of the present disclosure. It should also be understood that the scope of rights of the present disclosure is not limited to the above-described exemplary embodiments.

What is claimed is:

1. A thermal insulation structure for a vehicle window device, comprising:
   a heater that is provided at a device main body that is disposed on a vehicle interior side of a vehicle window;
   a heat-receiving component that is provided between the window and the heater, and that, by receiving heat from the heater, imparts radiant heat to the window; and
   a thermal insulation layer that is provided at a surface of the heater on an opposite side from the heat-receiving component, wherein:
   the thermal insulation layer is formed by mutually superimposing a plurality of thermal insulation materials,
   of the plurality of thermal insulation materials, a thermal insulation material on a closest side to the heater has greater heat resistance than a thermal insulation material on a furthest side from the heater, and the thermal insulation material on the furthest side from the heater has a lower thermal conductivity than the thermal insulation material on the closest side to the heater, wherein
   a thickness of the thermal insulation material on the closest side to the heater is thicker than a thickness of the thermal insulation material on the furthest side from the heater,
   the heater is a planar heater,
   the heat-receiving component includes a heat-receiving portion with which the heater overlaps,
   an outer configuration of the thermal insulation layer is the same shape as the heat-receiving portion,
   the heater includes a cable connection portion to which a cable that supplies power to the heater is connected, and
   the cable connection portion is located at a heater surface direction outer side of a portion of the heater that overlaps with the heat-receiving portion and further toward the surface direction outer side than an edge of the heat-receiving portion.

2. The thermal insulation structure for a vehicle window device according to claim 1, wherein the thermal insulation layer is formed by mutually superimposing two sheets of the thermal insulation materials.

3. The thermal insulation structure for a vehicle window device according to claim 1, wherein the thermal insulation material on the furthest side from the heater is formed from a polyolefin foam material, while the thermal insulation material on the closest side to the heater is formed from a polyurethane foam material.

4. The thermal insulation structure for a vehicle window device according to claim 2, wherein the thermal insulation material on the furthest side from the heater is formed from a polyolefin foam material, while the thermal insulation material on the closest side to the heater is formed from a polyurethane foam material.

5. A thermal insulation structure for a vehicle window device, comprising:
   a heater that is provided at a device main body that is disposed on a vehicle interior side of a vehicle window;
   a heat-receiving component that is provided between the window and the heater, and that, by receiving heat from the heater, imparts radiant heat to the window; and
   a thermal insulation layer that is provided at a surface of the heater on an opposite side from the heat-receiving component, wherein:
   the thermal insulation layer is formed by mutually superimposing a plurality of thermal insulation materials,
   of the plurality of thermal insulation materials, a thermal insulation material on a closest side to the heater has greater heat resistance than a thermal insulation material on a furthest side from the heater, and the thermal insulation material on the furthest side from the heater has a lower thermal conductivity than the thermal insulation material on the closest side to the heater, wherein
   a thickness of the thermal insulation material on the closest side to the heater is thicker than a thickness of the thermal insulation material on the furthest side from the heater,
   the heat-receiving component includes a heat-receiving portion with which the heater overlaps,
   an outer configuration of the thermal insulation layer is the same shape as the heat-receiving portion,
   a cable connection portion of the heater is located extending outwardly along a surface direction from an edge of the heater that is outside the portion of the heater that overlaps with the heat-receiving portion, and
   a non-woven cloth is disposed on a surface of the heat-receiving component at a window side thereof.

6. The thermal insulation structure for a vehicle window device according to claim 2, wherein:
   a fuse module that has a fuse and lead wires is arranged between the heater and the thermal insulation material on the closest side to the heater, and
   the thermal insulation material on the closest side to the heater is formed with an opening for accommodating the fuse.

* * * * *